(12) United States Patent
Okuwaki (10) Patent No.: US 9,840,142 B2
(45) Date of Patent: Dec. 12, 2017

(54) DRIVE SYSTEM FOR HYBRID VEHICLE (71) Applicant: TOYOTA JIDOSHA KABUSHIKI KAISHA, Toyota-shi, Aichi-ken (JP)

(72) Inventor: Shigeru Okuwaki, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 111 days.

(21) Appl. No.: 14/890,760

(22) PCT Filed: May 13, 2013

(86) PCT No.: PCT/JP2013/063321
§ 371 (c)(1),
(2) Date: Nov. 12, 2015

(87) PCT Pub. No.: WO2014/184853
PCT Pub. Date: Nov. 20, 2014

(65) Prior Publication Data
US 2016/0144707 A1 May 26, 2016

(51) Int. Cl.
*B60K 6/547* (2007.10)
*B60W 20/40* (2016.01)
*B60W 10/08* (2006.01)
*B60W 10/115* (2012.01)
*B60K 6/40* (2007.10)
(Continued)

(52) U.S. Cl.
CPC ............. *B60K 6/547* (2013.01); *B60K 6/365* (2013.01); *B60K 6/40* (2013.01); *B60K 6/445* (2013.01); *B60K 6/48* (2013.01); *B60W 10/08* (2013.01); *B60W 10/115* (2013.01); *B60W 20/40* (2013.01); *B60K 2006/381* (2013.01); *B60W 2520/10* (2013.01); *B60W 2710/083* (2013.01); *Y02T 10/6221* (2013.01);
(Continued)

(58) Field of Classification Search
None
See application file for complete search history.

(56) References Cited

U.S. PATENT DOCUMENTS

| 8,162,084 B2 * | 4/2012 | Iwanaka | B60K 6/365 |
| | | | 180/65.235 |
| 2011/0245003 A1 * | 10/2011 | Takami | B60K 6/365 |
| | | | 475/5 |

(Continued)

FOREIGN PATENT DOCUMENTS

| JP | 2004-345527 A | 12/2004 |
| WO | 2014/184852 A1 | 11/2014 |
| WO | 2014/184854 A1 | 11/2014 |

*Primary Examiner* — Derek D Knight
*Assistant Examiner* — Timothy M Hannon
(74) *Attorney, Agent, or Firm* — Andrews Kurth Kenyon LLP (57) ABSTRACT

A drive system includes: a first planetary gear unit, in which a carrier is connected to an internal combustion engine, a sun gear is connected to a first MG, and a ring gear is connected, via a first drive gear and a first driven gear, to a counter shaft; and a second planetary gear unit, in which a brake is provided to a sun gear, a carrier is connected to the internal combustion engine, and a ring gear is connected, via a second drive gear and a second driven gear, to the counter shaft. A gear ratio of the first drive gear and the first driven gear is larger than a gear ratio of the second drive gear and the second driven gear.

3 Claims, 3 Drawing Sheets

(51) Int. Cl.
- *B60K 6/365* (2007.10)
- *B60K 6/445* (2007.10)
- *B60K 6/48* (2007.10)
- *B60K 6/38* (2007.10)

(52) U.S. Cl.
CPC ........ *Y02T 10/6239* (2013.01); *Y02T 10/7258* (2013.01); *Y10S 903/91* (2013.01); *Y10S 903/919* (2013.01)

(56) References Cited

U.S. PATENT DOCUMENTS

| | | | |
|---|---|---|---|
| 2011/0319224 A1* | 12/2011 | Takami | B60K 6/445 477/3 |
| 2012/0028747 A1* | 2/2012 | Imamura | B60K 6/365 475/5 |
| 2014/0162823 A1* | 6/2014 | Choi | B60K 6/50 475/5 |

* cited by examiner

DRIVE SYSTEM FOR HYBRID VEHICLE

CROSS-REFERENCE TO RELATED APPLICATION

This is a national phase application based on the PCT International Patent Application No. PCT/JP2013/063321 filed May 13, 2013, the entire contents of which are incorporated herein by reference.

TECHNICAL FIELD

The invention relates to a drive system for a hybrid vehicle that can transmit rotation of an internal combustion engine to drive wheels by changing a speed of the rotation in a differential mechanism and a motor generator.

BACKGROUND ART

A hybrid vehicle in which an internal combustion engine, a motor generator, and an output shaft are connected to different rotational elements to each other of a planetary gear unit so as to continuously change a ratio between a speed of the internal combustion engine and a rotational speed of the output shaft, that is, a transmission gear ratio in the planetary gear unit and the motor generator has been known. As a drive system of such a hybrid vehicle, a system that includes two planetary gear units and a brake to realize a continuously variable state in which the transmission gear ratio is continuously changed by these and a overdrive state in which the speed of the internal combustion engine is lower than the rotational speed of the output shaft has been known (see Patent Literature 1). In this system of Patent Literature 1, only one planetary gear unit of the two planetary gear units is used to transmit rotation in the case of the continuously variable state. Thus, mechanical loss is suppressed.

RELATED ART LITERATURE

Patent Literature

Patent Literature 1: Japanese Patent Application Publication No. 2004-345527 (JP 2004-345527 A)

SUMMARY OF THE INVENTION

Problem to be Solved by the Invention

In the system of Patent Literature 1, both of the two planetary gear units are used in the case of the overdrive state to transmit the rotation of the internal combustion engine to the output shaft. Thus, there still remains room to further reduce the mechanical loss.

For this reason, the invention has an object of providing a drive system for a hybrid vehicle that can further reduce mechanical loss compared to conventional systems.

Means for Solving the Problem

A drive system of the invention includes: an internal combustion engine; a motor generator; an output member connected to a drive wheel so as to be able to transmit power; a first differential mechanism that has a first rotation element, a second rotation element, and a third rotation element capable of making differential rotation with each other and in which the third rotation element is arranged between the first rotation element and the second rotation element in a collinear diagram; a second differential mechanism that has a first rotation element, a second rotation element, and a third rotation element capable of making differential rotation with each other and in which the third rotation element is arranged between the first rotation element and the second rotation element in the collinear diagram; and locking mechanism capable of being switched between a locked state in which the first rotation element of the second differential mechanism is unrotatably locked and a released state in which rotation of the first rotation element of the second differential mechanism is allowed. An output shaft of the internal combustion engine, the third rotation element of the first differential mechanism, and the third rotation element of the second differential mechanism are coupled to rotate integrally, an output shaft of the motor generator and the first rotation element of the first differential mechanism are coupled to rotate integrally, the second rotation element of the first differential mechanism is connected to the output member via a first rotation transmission path so as to be able to transmit rotation, the second rotation element of the second differential mechanism is connected to the output member via a second rotation transmission path so as to be able to transmit rotation, the first rotation transmission path is formed such that the rotation is transmitted from the second rotation element of the first differential mechanism to the output member by changing a speed thereof at a first transmission gear ratio, and the second rotation transmission path is formed such that the rotation is transmitted from the second rotation element of the second differential mechanism to the output member by changing the speed thereof at a second transmission gear ratio that is smaller than the first transmission gear ratio.

In the drive system of the invention, the rotation of the internal combustion engine can be transmitted to the output member only via the first differential mechanism by switching the locking mechanism to the released state and generating a reaction force by the motor generator. In this case, a transmission gear ratio between a speed of the internal combustion engine and a rotational speed of the output member can continuously be changed by changing a rotational speed of the motor generator. That is, the drive system can be brought into a continuously variable state. Meanwhile, the rotation of the internal combustion engine can be transmitted to the output member only via the second differential mechanism by switching the locking mechanism to the locked state and bringing torque of the motor generator to zero. By switching the locking mechanism to the locked state, just as described, the speed of the internal combustion engine can be reduced to be lower than the rotational speed of the output member. Thus, the drive system can be brought into an overdrive state. Just as described, according to the drive system of the invention, the rotation of the internal combustion engine is transmitted via only one of the differential mechanisms in either state of the continuously variable state or the overdrive state. Therefore, mechanical loss can be reduced in comparison with a conventional drive system.

In one embodiment of the drive system of the invention, the internal combustion engine, the motor generator, the first differential mechanism, the second differential mechanism, and the locking mechanism may be coaxially arranged, the first differential mechanism and the second differential mechanism may be arranged between the internal combustion engine and the motor generator, and the locking mechanism may be arranged on an opposite side of the internal combustion engine with the motor generator, the first differential mechanism, and the second differential mechanism being interposed therebetween. According to this embodiment, since the locking mechanism is not arranged between the motor generator and the internal combustion engine, an outer diameter of the locking mechanism can be reduced. Thus, the locking mechanism can be downsized.

The one embodiment of the drive system of the invention may further include vehicle control unit for switching the locking mechanism to the locked state and bringing the torque of the motor generator to zero in the case where a speed of the vehicle is at least equal to a specified determination speed that is set in advance. By controlling the locking mechanism and the motor generator, just as described, the drive system can be brought into the overdrive state when the vehicle runs at a high speed. In this way, the speed of the internal combustion engine can be reduced. Therefore, fuel economy can be improved.

MODES FOR CARRYING OUT THE INVENTION

Figure 1:
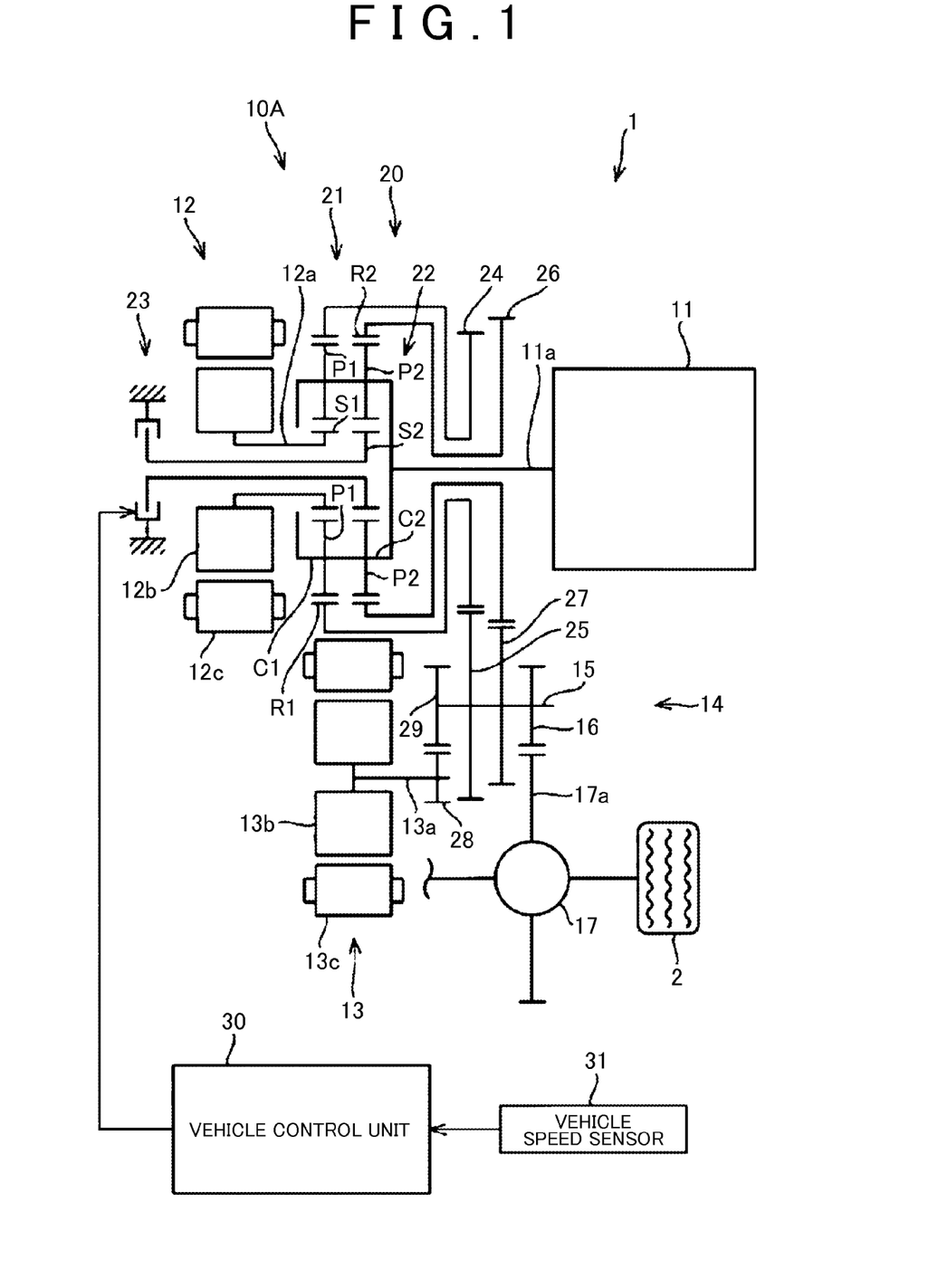
FIG. 1 is a view of a drive system according to a first embodiment of the invention.

FIG. 1 is a skeletal view of a drive system according to a first embodiment of the invention. This drive system 10A is mounted in a hybrid vehicle 1 and includes an internal combustion engine (hereinafter may be referred to as an engine) 11, a first motor generator (hereinafter may be abbreviated as a first MG) 12, a second motor generator (hereinafter may be abbreviated as a second MG) 13. The engine 11 is a well-known spark-ignition-type internal combustion engine mounted in the hybrid vehicle. Thus, a detailed description thereon will not be made. The first MG 12 and the second MG 13 are well-known motor generators, each of which functions as a motor and a generator. The first MG 12 includes: a rotor 12b that integrally rotates with a rotor shaft 12a; and a stator 12c that is coaxially arranged on an outer circumference of the rotor 12b and is fixed to a case (not shown). Similarly, the second MG 13 includes: a rotor 13b that integrally rotates with a rotor shaft 13a; and a stator 13c that is coaxially arranged on an outer circumference of the rotor 13b and is fixed to a case.

An output shaft 11a of the engine 11 and the rotor shaft 12a of the first MG 12 are connected to a power split mechanism 20. An output section 14 for outputting power to drive wheels 2 of the vehicle 1 is also connected to the power split mechanism 20. The output section 14 includes a counter shaft 15 as an output member and an output gear 16 that integrally rotates with the counter shaft 15. The output gear 16 meshes with a ring gear 17a that is provided in a case of a differential mechanism 17. The differential mechanism 17 is a well-known mechanism that splits the power transmitted to the ring gear 17a to the right and left drive wheels 2.

The power split mechanism 20 includes a first planetary gear unit 21 and a second planetary gear unit 22. These planetary gear units 21, 22 are planetary gear units of a single pinion type. The first planetary gear unit 21 includes: a sun gear S1 as an outer tooth gear; a ring gear R1 as an inner tooth gear that is coaxially arranged with the sun gear S1; and a carrier C1 for retaining a pinion gear P1 that meshes with these gears S1, R1 in a manner to allow rotation and revolution thereof around the sun gear S1. Hereinafter, there are cases where the sun gear S1 of the first planetary gear unit 21 is referred to as the first sun gear S1, the ring gear R1 thereof is referred to as the first ring gear R1, and the carrier C1 thereof is referred to as the first carrier C1. Similarly, the second planetary gear unit 22 includes: a sun gear S2 as the outer tooth gear; a ring gear R2 as an inner tooth gear that is coaxially arranged with the sun gear S2; and a carrier C2 for retaining a pinion gear P2 that meshes with these gears S2, R2 in a manner to allow rotation and revolution thereof around the sun gear S2. Hereinafter, there are cases where the sun gear S2 of the second planetary gear unit 22 is referred to as the second sun gear S2, the ring gear R2 thereof is referred to as the second ring gear R2, and the carrier C2 thereof is referred to as the second carrier C2. Each of the first planetary gear unit 21 and the second planetary gear unit 22 is configured that transmission gear ratios among the sun gear, the carrier, and the ring gear are the same.

As shown in this drawing, the first carrier C1 and the second carrier C2 are coupled to rotate integrally with the output shaft 11a of the engine 11. The first sun gear S1 is coupled to the rotor shaft 12a of the first MG 12. The second sun gear S2 is coupled to a brake 23. This brake 23 can be switched between a locked state in which the second sun gear S2 is unrotatably locked and a released state in which rotation of the second sun gear S2 is allowed. It should be noted that a well-known friction brake or the like may be used as the brake 23. Thus, a detailed description on the brake 23 will not be made.

As shown in this drawing, the engine 11, the first MG 12, the first planetary gear unit 21, the second planetary gear unit 22, and the brake 23 are coaxially arranged. In addition, the first planetary gear unit 21 and the second planetary gear unit 22 are arranged between the engine 11 and the first MG 12. The brake 23 is arranged on an opposite side of the engine 11 with the first MG 12, the first planetary gear unit 21, and the second planetary gear unit 22 being interposed therebetween. That is, the brake 23 is arranged not to be interposed between the engine 11 and the first MG 12.

The first ring gear R1 is coupled to rotate integrally with a first drive gear 24. This first drive gear 24 meshes with a first driven gear 25 that is provided on the counter shaft 15. In addition, the second ring gear R2 is coupled to rotate integrally with a second drive gear 26. The second drive gear 26 meshes with a second driven gear 27 that is provided on the counter shaft 15. A value set for a gear ratio γ1 between the first drive gear 24 and the first driven gear 25 is larger than a value set for a gear ratio γ2 between the second drive gear 26 and the second driven gear 27. That is, these gear ratios have a relationship of γ1>γ2.

A third drive gear 28 is provided on the rotor shaft 13a of the second MG 13. The third drive gear 28 meshes with a third driven gear 29 that is provided on the counter shaft 15.

Figure 2:
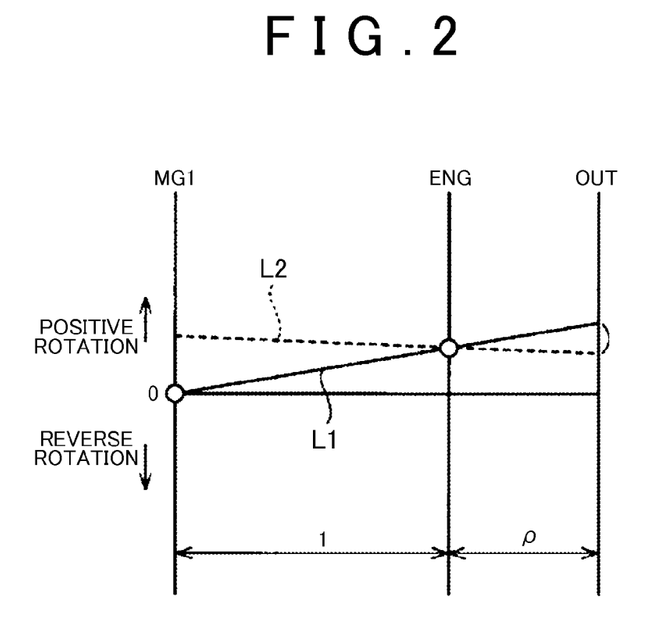
FIG. 2 is a diagram that shows one example of a collinear diagram at a time that the drive system according to the first embodiment is in a continuously variable mode.

In this drive system 10A, a continuously variable mode and an overdrive mode are realized by switching states of the brake 23. In the continuously variable mode, the brake 23 is switched to the released state. FIG. 2 shows one example of a collinear diagram of the drive system 10A during the continuously variable mode. In this diagram, "ENG" indicates the engine 11, "OUT" indicates the counter shaft 15, and "MG1" indicates the first MG 12. In addition, a solid line L1 indicates a relationship of each rotation element of the first planetary gear unit 21, and a broken line L2 indicates a relationship of each rotation element of the second planetary gear unit 22. "ρ" indicates a transmission gear ratio between the first carrier C1 and the first ring gear R1. As shown in this diagram, when the transmission gear ratio between the first sun gear S1 and the first carrier C1 is "1", a smaller value than 1 is set as the transmission gear ratio ρ. It should be noted that this drawing is the collinear diagram at a time that a rotational speed of the first MG 12 is 0.

As described above, since the brake 23 is switched to the released mode in the continuously variable mode, the second sun gear S2 rotates idle. Accordingly, rotation of the engine 11 is transmitted to the counter shaft 15 only via the first planetary gear unit 21. In addition, in this case, a ratio (the transmission gear ratio) between a speed of the engine 11 and a rotational speed of the counter shaft 15 can continuously be changed by appropriately adjusting the rotational speed of the first MG 12. Meanwhile, since the second sun gear S2 rotates idle, the second planetary gear unit 22 does not contribute to transmission of the rotation of the engine 11.

Figure 3:
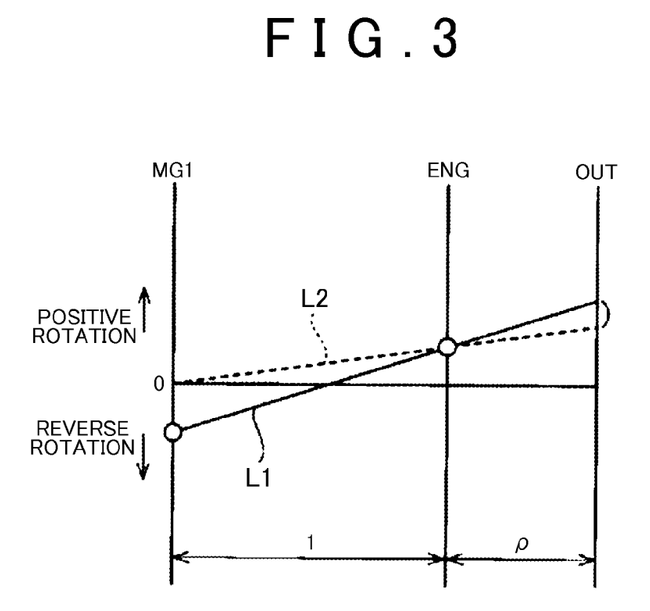
FIG. 3 is a diagram that shows one example of a collinear diagram at a time that the drive system according to the first embodiment is in an overdrive mode.

The brake 23 is switched to the locked state in the overdrive mode. Then, torque of the first MG 12 is brought to zero. That is, the first MG 12 rotates idle. FIG. 3 shows one example of a collinear diagram of the drive system 10A during the overdrive mode. It should be noted that, in this diagram, common parts as those in FIG. 2 are denoted by the same reference numerals and symbols and a description thereon will not be made. In this mode, since the brake 23 is switched to the locked state, the second sun gear S2 is unrotatably locked. In addition, since the first MG 12 rotates idle, the rotation of the engine 11 is transmitted to the counter shaft 15 only via the second planetary gear unit 22. As shown in this diagram, the rotational speed of the counter shaft 15 is higher than the speed of the engine 11 in the overdrive mode. Accordingly, the drive system 10A is brought into an overdrive state. Meanwhile, since the first MG 12 rotates idle, the first planetary gear unit 21 does not contribute to transmission of the rotation of the engine 11. It should be noted that, when the transmission gear ratio between the second sun gear S2 and the second carrier C2 is 1 as described above, the smaller value than 1 is set as the transmission gear ratio ρ between the second carrier C2 and the second ring gear R2. Accordingly, in the case of switching to the overdrive mode, a difference between a rotational speed of the second sun gear S2 and a rotational speed of the first sun gear S1 can be reduced. Thus, the rotational speed of the first MG 12 can be reduced.

As described above, the torque is output from the first planetary gear unit 21 in the continuously variable mode. On the other hand, the torque is output from the second planetary gear unit 22 in the overdrive mode. However, in either one of the modes, the same counter shaft 15 receives the torque in the end. A rotational speed of the first planetary gear unit 21 and a rotational speed of the second planetary gear unit 22 are the same in either one of the modes. Thus, output of the counter shaft 15 does not change. However, the speed of the engine 11 is reduced in the overdrive mode. Accordingly, the three rotation elements of the second planetary gear unit 22 constitute the overdrive state.

The brake 23 is controlled by a vehicle control unit 30. The vehicle control unit 30 is configured as a computer unit that includes a microprocessor and peripheral equipment like a RAM, a ROM, and the like that are required for an operation thereof. The vehicle control unit 30 retains various types of control programs for making the vehicle 1 run appropriately. The vehicle control unit 30 executes control of control targets, such as the engine 11 and each of the MGs 12, 13, by executing these programs. Various sensors for obtaining information on the vehicle 1 are connected to the vehicle control unit 30. For example, a vehicle speed sensor 31 is connected to the vehicle control unit 30. The vehicle speed sensor 31 outputs a signal that corresponds to a speed (a vehicle speed) of the vehicle 1. In addition to the above, various sensors, switches, and the like are connected to the vehicle control unit 30. However, those are not shown.

The vehicle control unit 30 switches the mode of the drive system 10A on the basis of the vehicle speed. The vehicle control unit 30 switches the brake 23 to the locked state in the case where the vehicle speed is at least equal to a determination speed that is set in advance. In this way, the mode of the drive system 10A is switched to the overdrive mode. It should be noted that the determination speed is set as a reference that is used to determine whether the vehicle 1 runs at a high speed. On the other hand, the vehicle control unit 30 switches the brake 23 to the released state in the case where the vehicle speed is lower than the determination speed. In this way, the mode of the drive system 10A is switched to the continuously variable mode.

As it has been described so far, in this embodiment, as shown in FIG. 3, the overdrive mode can substantially be realized by the three rotation elements of the second planetary gear unit 22. In addition, the continuously variable mode can also be realized by the three rotation elements of the first planetary gear unit 21. Accordingly, in either mode of the continuously variable mode or the overdrive mode, the rotation of the engine 11 is transmitted to the counter shaft 15 via only one of the planetary gear units. Thus, mechanical loss can be reduced.

In addition, as shown in FIG. 1, the brake 23 is arranged not to be interposed between the engine 11 and the first MG 12. In this case, an outer diameter of the brake 23 can be reduced. Thus, the brake 23 can be downsized.

In the case where the vehicle 1 runs at the high speed, the brake 23 is switched to the locked state, and the torque of the first MG12 is brought to zero. Accordingly, the mode of the drive system 10A is switched to the overdrive mode, and thus the speed of the engine 11 can be reduced. Therefore, fuel economy can be improved.

In this embodiment, the first MG 12 corresponds to the motor generator of the invention. The first planetary gear unit 21 corresponds to the first differential mechanism of the invention. The first sun gear S1 corresponds to the first rotation element of the first differential mechanism of the invention. The first ring gear R1 corresponds to the second rotation element of the first differential mechanism of the invention. The first carrier C1 corresponds to the third rotation element of the first differential mechanism of the invention. The second planetary gear unit 22 corresponds to the second differential mechanism of the invention. The second sun gear S2 corresponds to a first rotation element of the second differential mechanism of the invention. The second ring gear R2 corresponds to the second rotation element of the second differential mechanism of the invention. The second carrier C2 corresponds to the third rotation element of the second differential mechanism of the invention. The brake 23 corresponds to the locking mechanism of the invention. The vehicle control unit 30 corresponds to a vehicle control unit of the invention. In this embodiment, the first rotation transmission path of the invention is formed by the first drive gear 24 and the first driven gear 25. In addition, the second rotation transmission path of the invention is formed by the second drive gear 26 and the second driven gear 27.

Figure 4:
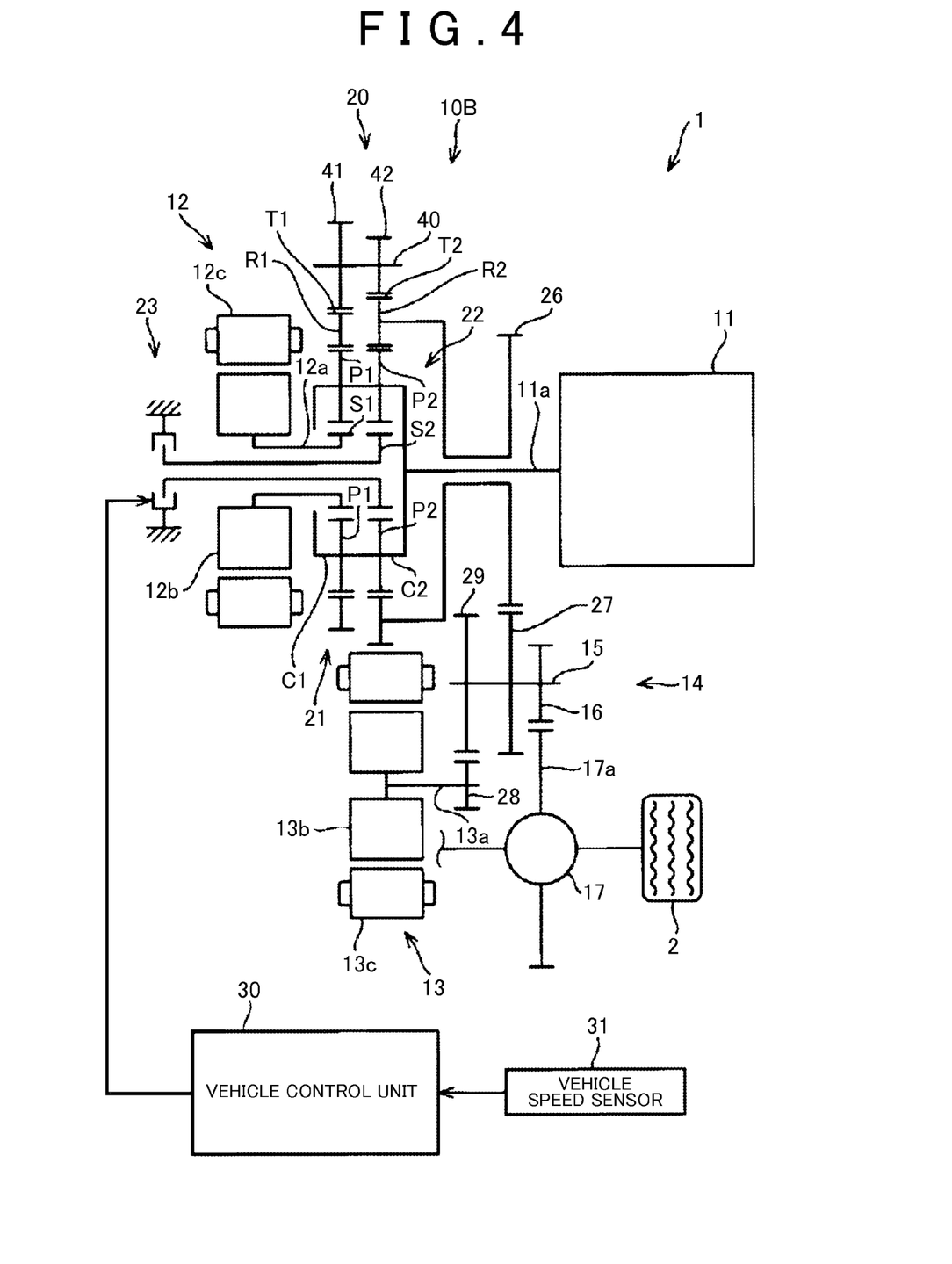
FIG. 4 is a view of a drive system according to a second embodiment of the invention.

Next, a description will be made on a drive system according to a second embodiment of the invention with reference to FIG. 4. FIG. 4 is a skeletal view of a drive system 10B according to this embodiment. It should be noted that, in this drawing, common parts as those in FIG. 1 are denoted by the same reference numerals and symbols and a description thereon will not be made.

In this embodiment, an outer tooth T1 is provided on an outer circumferential surface of the first ring gear R1. Hereinafter, this outer tooth T1 may be referred to as a first outer tooth. In addition, an outer tooth T2 is provided on an outer circumferential surface of the second ring gear R2. Hereinafter, this outer tooth T2 may be referred to as a second outer tooth. Furthermore, the first ring gear R1 is formed to have a smaller outer diameter than the second ring gear R2. Thus, the number of teeth of the first outer tooth T1 is smaller than the number of teeth of the second outer tooth T2. It should be noted that an inner diameter of the first ring gear R1 and an inner diameter of the second ring gear R2 are the same, and the number of teeth of inner teeth of these ring gears R1, R2 are the same.

As shown in this drawing, on a radially outer side of the first ring gear R1 and the second ring gear R2, a transmission shaft 40 is provided in a manner to be parallel with axes of these ring gears R1, R2. A first intermediate gear 41 and a second intermediate gear 42 are provided on the transmission shaft 40. The first intermediate gear 41 meshes with the first outer tooth T1. The second intermediate gear 42 meshes with the second outer tooth T2. In addition, a value set for a gear ratio γ11 between the first outer tooth T1 and the first intermediate gear 41 is larger than a value set for a gear ratio γ12 between the second outer tooth T2 and the second intermediate gear 42. That is, these gear ratios have a relationship of γ11>γ12. Thus, a rotational speed of the first ring gear R1 is lower than a rotational speed of the second ring gear R2.

Also in this drive system 10B, the continuously variable mode and the overdrive mode are realized by switching the state of the brake 23. The brake 23 is switched to the released state in the continuously variable mode. Thus, the second sun gear S2 rotates idle. In this case, the rotation of the engine 11 is transmitted to the counter shaft 15 via the first planetary gear unit 21, the transmission shaft 40, the second ring gear R2, and the second drive gear 26. At this time, the second ring gear R2 only functions as a member for transmitting rotation of the second intermediate gear 42 to the second drive gear 26. Thus, also in this continuously variable mode, the second planetary gear unit 22 does not contribute to the transmission of the rotation of the engine 11.

The brake 23 is switched to the locked state in the overdrive mode. Then, the torque of the first MG 12 is brought to zero. In this case, the rotation of the engine 11 is transmitted to the counter shaft 15 via the second planetary gear unit 22 and the second drive gear 26. Thus, the first planetary gear unit 21 does not contribute to the transmission of the rotation of the engine 11.

It should be noted that, also in this embodiment, the brake 23 is controlled by the vehicle control unit 30. The vehicle control unit 30 switches the brake 23 to the locked state in the case where the vehicle speed is at least equal to the determination speed. In this way, the mode of the drive system 10B is switched to the overdrive mode. On the other hand, the vehicle control unit 30 switches the brake 23 to the released state in the case where the vehicle speed is lower than the determination speed. In this way, the mode of the drive system 10B is switched to the continuously variable mode.

As it has been described so far, also in this embodiment, the rotation of the engine 11 is transmitted to the counter shaft 15 via only one of the planetary gear units in both modes of the continuously variable mode and the overdrive mode. Thus, the mechanical loss can be reduced. In addition, the brake 23 is arranged so as not to be interposed between the engine 11 and the first MG 12. Thus, the brake 23 can be downsized. Furthermore, in the case where the vehicle 1 runs at the high speed, the mode of the drive system 10B is switched to the overdrive mode. Therefore, the fuel economy can be improved.

In this embodiment, the first rotation transmission path of the invention is formed by the first intermediate gear 41, the transmission shaft 40, the second intermediate gear 42, the second ring gear R2, the second drive gear 26, and the second driven gear 27.

The invention is not limited to the above-described embodiments, but can be implemented in various embodiments. For example, the planetary gear units provided in the drive system of the invention are not limited to the planetary gear units of the single pinion type. In the drive system of the invention, planetary gear units of a double pinion type may be used. However, in this case, connection destinations of the ring gear and the carrier are appropriately changed in each embodiment.

What is claimed is:

1. A drive system for a hybrid vehicle, the drive system comprising:
   an internal combustion engine;
   a motor generator;
   an output member connected to first and second drive wheels so as to be able to transmit power to first and second driven wheels located on the output member;
   a first differential mechanism that has a first rotation element, a second rotation element, and a third rotation element capable of making differential rotation with each other and in which the third rotation element is arranged between the first rotation element and the second rotation element;
   a second differential mechanism that has a first rotation element, a second rotation element, and a third rotation element capable of making differential rotation with each other and in which the third rotation element is arranged between the first rotation element and the second rotation element; and
   a locking mechanism capable of being switched between a locked state in which the first rotation element of the second differential mechanism is unrotatably locked and a released state in which rotation of the first rotation element of the second differential mechanism is allowed,
   wherein an output shaft of the internal combustion engine, the third rotation element of the first differential mechanism, and the third rotation element of the second differential mechanism are coupled to rotate integrally,
   an output shaft of the motor generator and the first rotation element of the first differential mechanism are coupled to rotate integrally,
   the second rotation element of the first differential mechanism is connected to the output member via a first rotation transmission path so as to be able to transmit rotation to the first driven gear wheel, the second rotation element of the second differential mechanism is connected to the output member via a second rotation transmission path so as to be able to transmit rotation to the second driven gear wheel, the first rotation transmission path is configured that the rotation is transmitted from the second rotation element of the first differential mechanism to the output member by the first drive gear wheel and the first driven gear wheel, and the second rotation transmission path is configured that the rotation is transmitted from the second rotation element of the second differential mechanism to the output member by the second drive gear wheel and the second driven gear wheel, and wherein a gear ratio between the first drive gear wheel and the first driven gear wheel is larger than a gear ratio between the second drive gear wheel and the second driven gear wheel.

2. The drive system according to claim 1, wherein the internal combustion engine, the motor generator, the first differential mechanism, the second differential mechanism, and the locking mechanism are coaxially arranged, the first differential mechanism and the second differential mechanism are axially arranged between the internal combustion engine and the motor generator, and the motor generator, the first differential mechanism, and the second differential mechanism being axially interposed between the locking mechanism and the internal combustion engine.

3. The drive system according to claim 1, further comprising a vehicle control unit, the vehicle control unit switching the locking mechanism to the locked state.

* * * * *

UNITED STATES PATENT AND TRADEMARK OFFICE
CERTIFICATE OF CORRECTION

PATENT NO. : 9,840,142 B2
APPLICATION NO. : 14/890760
DATED : December 12, 2017
INVENTOR(S) : Shigeru Okuwaki et al.

It is certified that error appears in the above-identified patent and that said Letters Patent is hereby corrected as shown below:

In the Claims

Column 8, Line 37 Claim 1 change the content from:
"drive wheels"
To:
"drive gear wheels"

Column 8, Line 38 Claim 1 change the content from:
"second drive wheels"
To:
"second drive gear wheels"

Signed and Sealed this
Nineteenth Day of June, 2018

Andrei Iancu
*Director of the United States Patent and Trademark Office*